United States Patent [19]

Anderson

[11] Patent Number: 5,259,655
[45] Date of Patent: * Nov. 9, 1993

[54] ADD-ON WRAP-AROUND DASHBOARD

[76] Inventor: John W. Anderson, 2315 SW. 350th Pl., Federal Way, Wash. 98023

[*] Notice: The portion of the term of this patent subsequent to Dec. 29, 2009 has been disclaimed.

[21] Appl. No.: 955,644

[22] Filed: Oct. 2, 1992

Related U.S. Application Data

[63] Continuation of Ser. No. 776,814, Oct. 15, 1991, Pat. No. 5,174,621.

[51] Int. Cl.$^5$ ............................................. B60K 37/02
[52] U.S. Cl. ...................................... 296/70; 296/72; 180/90; 248/27.1; 361/679
[58] Field of Search ............... 296/70, 72, 73, 74; 180/90; D12/192; 340/815.2, 815.14, 461; 200/296; 248/27.1, 27.3, 904; 361/331, 380

[56] References Cited

U.S. PATENT DOCUMENTS

| | | | |
|---|---|---|---|
| D. 202,262 | 9/1965 | Brunger et al. | D12/192 |
| D. 294,140 | 2/1988 | Koch | D12/192 |
| 1,145,698 | 7/1915 | Ohlson | 180/90 X |
| 1,407,751 | 2/1922 | Jeffers | D12/192 |
| 1,639,598 | 8/1927 | Edelmann | 248/27.3 |
| 1,722,565 | 7/1929 | Dunn | 180/90 |
| 2,091,059 | 8/1937 | Tjaarda | 180/90 |
| 2,165,660 | 7/1939 | Snyder et al. | 180/90 |
| 3,194,338 | 7/1965 | Rutman et al. | 180/90 |
| 3,269,210 | 8/1966 | Steele, Jr. et al. | 74/492 |
| 3,590,136 | 6/1971 | Kunishi et al. | 180/90 X |
| 3,906,371 | 9/1975 | Tsuji | 334/85 |
| 3,910,371 | 10/1975 | Magrini | 180/90 |
| 4,025,896 | 5/1977 | Hintze et al. | 340/461 |
| 4,194,585 | 3/1980 | Prince | 180/90 |
| 4,253,537 | 3/1981 | Intveld | 180/90 |
| 4,392,539 | 7/1983 | Fujii et al. | 180/90 |
| 4,447,860 | 5/1984 | Stone et al. | 180/90 X |
| 4,507,706 | 3/1985 | Trexler, Jr. | 361/331 |
| 4,724,918 | 2/1988 | Raineri | 180/90 |
| 4,846,382 | 7/1989 | Foultner et al. | 224/42.42 |
| 5,174,621 | 12/1992 | Anderson | 296/70 |

FOREIGN PATENT DOCUMENTS

| | | |
|---|---|---|
| 1209178 | 8/1986 | Canada . |
| 2215616 | 11/1973 | Fed. Rep. of Germany ........ 180/90 |
| 2262350 | 6/1974 | Fed. Rep. of Germany ........ 180/90 |

OTHER PUBLICATIONS

Brochure: Mack Trucks CH600 Series, 1B-CH-Nov. 1989.
Brochure: Whitegmc Aero Series-Exclusive Air Management; Volvo GM Heavy Truck Corporation 1989, V009-001A.
Brochure: International from Navistar, 800 Series Tractors; AD-42547U.
Brochure: International from Navistar, 9000 SEries Conventional; AD-42548V.
Brochure: J. C. Whitney & Co. Catalog No. 523R, Oct. 1990, p. 214, "Fiberglass Dash and Console".

*Primary Examiner*—Dennis H. Pedder
*Attorney, Agent, or Firm*—Bruce A. Kaser; Glenn D. Bellamy

[57] ABSTRACT

The invention disclosed here is a dashboard accessory item in the form of an add-on housing that enables the repositioning of certain instrument panels closer to the driver, thereby making the instruments on such panels more accessible. In use, the instrument panels are first detached from a stock dashboard, and the housing is mounted to the dashboard over the location where the panels were originally located. The add-on housing projects forwardly of the dashboard, and the panels are remounted to its forward or frontal face. Such face angles toward the driver as it extends along the dashboard from the steering wheel toward the right-hand side of the cab. This repositions the panels much closer to the driver than they were when originally mounted to the stock dashboard.

5 Claims, 7 Drawing Sheets

ADD-ON WRAP-AROUND DASHBOARD

RELATED PATENT APPLICATIONS

This application is a continuation of my co-pending U.S. patent application Ser. No. 07/776,814, filed Oct. 15, 1991, now U.S. Pat. No. 5,174,621, issued Dec. 29, 1991.

DESCRIPTION

1. Technical Field

The invention disclosed here generally relates to instrument panels for vehicles, and more particularly, to dashboard housings or casings for mounting instruments such as gauges and switches to a vehicle dashboard.

2. Background Art

The dashboards of most older semi-tractor cabs, and many of the dashboards in current truck models, are generally designed so that they more or less extend straight across the cab. On this kind of dashboard, instruments that are located toward the center or right-hand side of the cab can be difficult to reach by the driver, at least in comparison to those which are positioned directly in front of or about the steering column. In some cases, the driver must actually lean over toward the right in order to better see a particular gauge or activate a switch. Not only does this inconvenience the driver in the physical sense, but it also creates a potential safety problem in that it tends to distract the driver's attention from the road.

In order to make dashboard instruments more accessible, some truck manufacturers have customized their dashboard designs so that they have a portion that curves and at least partially wraps around the driver. The curving portion projects more forwardly into the cab, and consequently, instruments located on such portion are easier to reach, because they are physically placed closer to the driver.

Wrap-around dashboards of the above-described type are typically made as a single modular unit that is installed in the cab at the time the truck is manufactured. However, since this is a relatively recent design, many trucks currently in use have dashboards that extend straight across the cab. Consequently, there is a need to develop devices or accessories that can modify the contour of dashboards on such trucks, so that they too will have the same advantages and conveniences of the wrap-around design. The invention disclosed here is a device of this type, or in other words, it is a dashboard accessory that functions to reposition at least some instrument panels in a stock dashboard so that they are better located with respect to the normal sitting position of the driver.

Add-on instrument panels that are mountable to a dashboard or other cab areas are known. This is clearly illustrated by the various disclosures set forth in U.S. Pat. Nos. 4,846,382; 4,392,539; 4,194,585; 3,590,136; 3,194,338; and 3,269,210. However, the common practice is to mount an accessory housing to the dashboard where the housing itself functions to add additional gauges, switches or other items that were not formerly present on the stock dashboard, i.e. stereo components, radar, etc.

The present invention departs from these past designs in that its purpose is not necessarily to add new instruments to an existing dashboard, but instead, it is designed to reposition pre-existing instrument panels closer to the driver. Specifically, the invention functions to modify the shape or contour of the dashboard so that pre-existing instruments no longer extend straight across the length of the dashboard, but instead tend to wrap around the driver, thus emulating modern, modular wrap-around dashboards. How the invention accomplishes this, including how it is different over and above the devices described in the above patents, and the other prior art in general, will become clear upon consideration of the following description.

SUMMARY OF THE INVENTION

The invention disclosed here is designed to be used in connection with a conventional vehicle flat dashboard that normally has at least one, and usually two, instrument panels that are mounted in a frontal region of the dashboard, just to the right of the steering column. Each instrument panel normally holds conventional dashboard instruments such as gauges, switches and the like. Further, each panel is conventionally mounted to the dashboard by screws or similar fasteners that are easily removable. Consequently, it is relatively easy to detach each panel from the dashboard as a single unit, while at the same time, maintaining all instrument connections.

The invention is a housing that is adapted to be mounted to the same frontal region of the dashboard where the above-described instrument panels are normally located. In use, the instrument panels are first disconnected from the dashboard, and the housing is then mounted to the dashboard over the location where the panels were formerly positioned. The housing has first and second forwardly-positioned panel openings in its front, one for each panel, in which the panels are remounted. Remounting the panels positions them closer to the driver.

The front or face of the housing is angled toward the driver as it extends along the dashboard away from the steering column and toward the right-hand side of the cab. In other words, an inwardmost edge of one of the panel openings, that which is nearest the steering column, is closer or spaced nearer the dashboard than an outwardmost edge of the second panel opening, the latter being positioned farthest from the steering column. This creates a wrap-around effect from the steering column toward the outer edge of the housing. Such effect may be enhanced by further angling the first panel opening relative to the second.

The invention as summarized above will become more fully understood upon consideration of the following detailed description which is to be read in conjunction with the drawings attached hereto.

BRIEF DESCRIPTION OF THE DRAWINGS

In the drawings, like reference numerals and numbers indicate like parts throughout the various views, unless specifically indicated otherwise, and wherein.

BEST MODE FOR CARRYING OUT THE INVENTION

Figure 1:
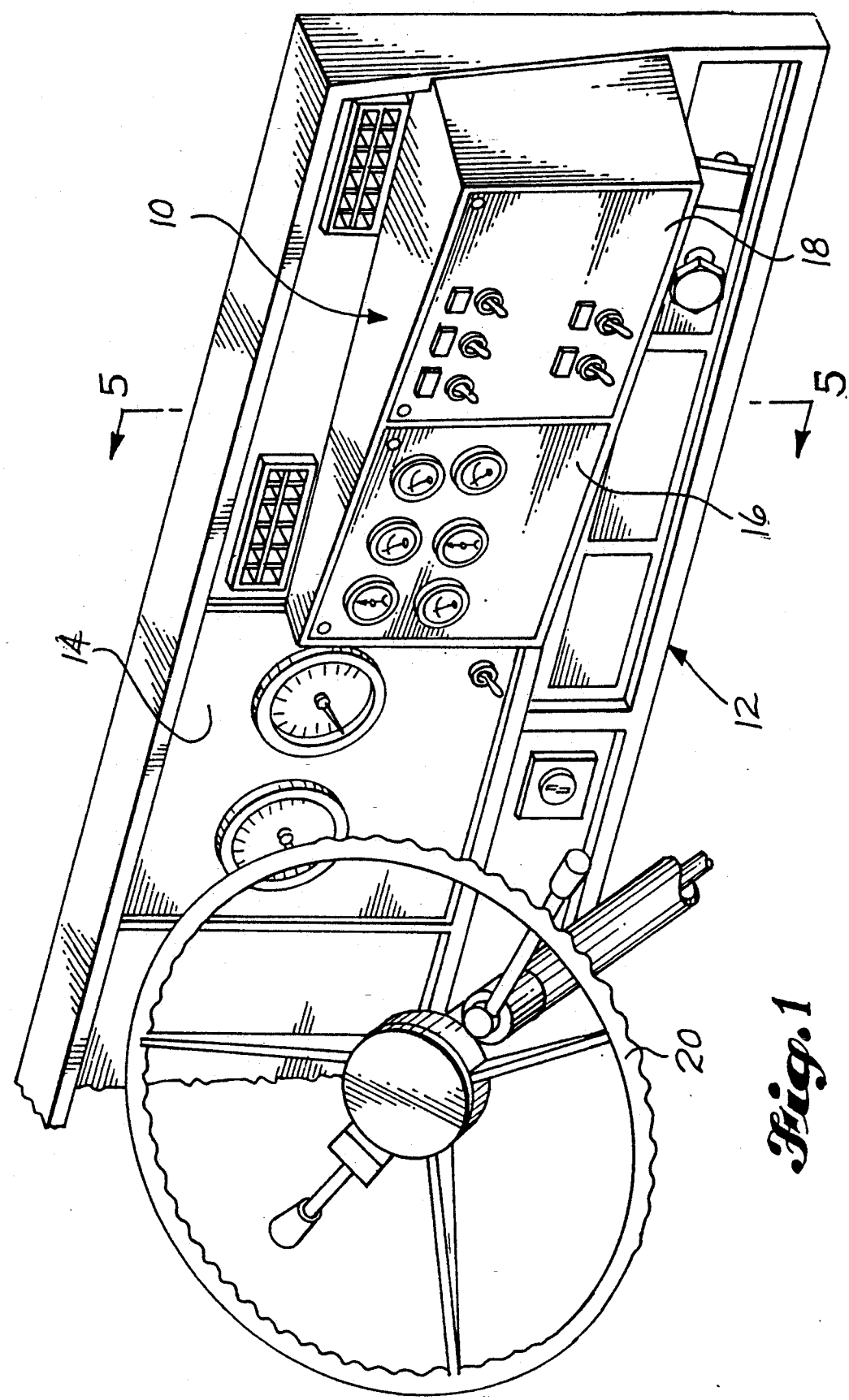
FIG. 1 is a pictorial view of a portion of a vehicle dashboard, and shows an add-on housing or dashboard accessory, in accordance with the invention, mounted to the front thereof.

Referring now to the drawings, and first to FIG. 1, shown generally at 10 is an add-on housing in accordance with a preferred embodiment of the invention. The housing 10 is shown mounted to a conventional truck dashboard, which is indicated generally at 12.

Figure 2:
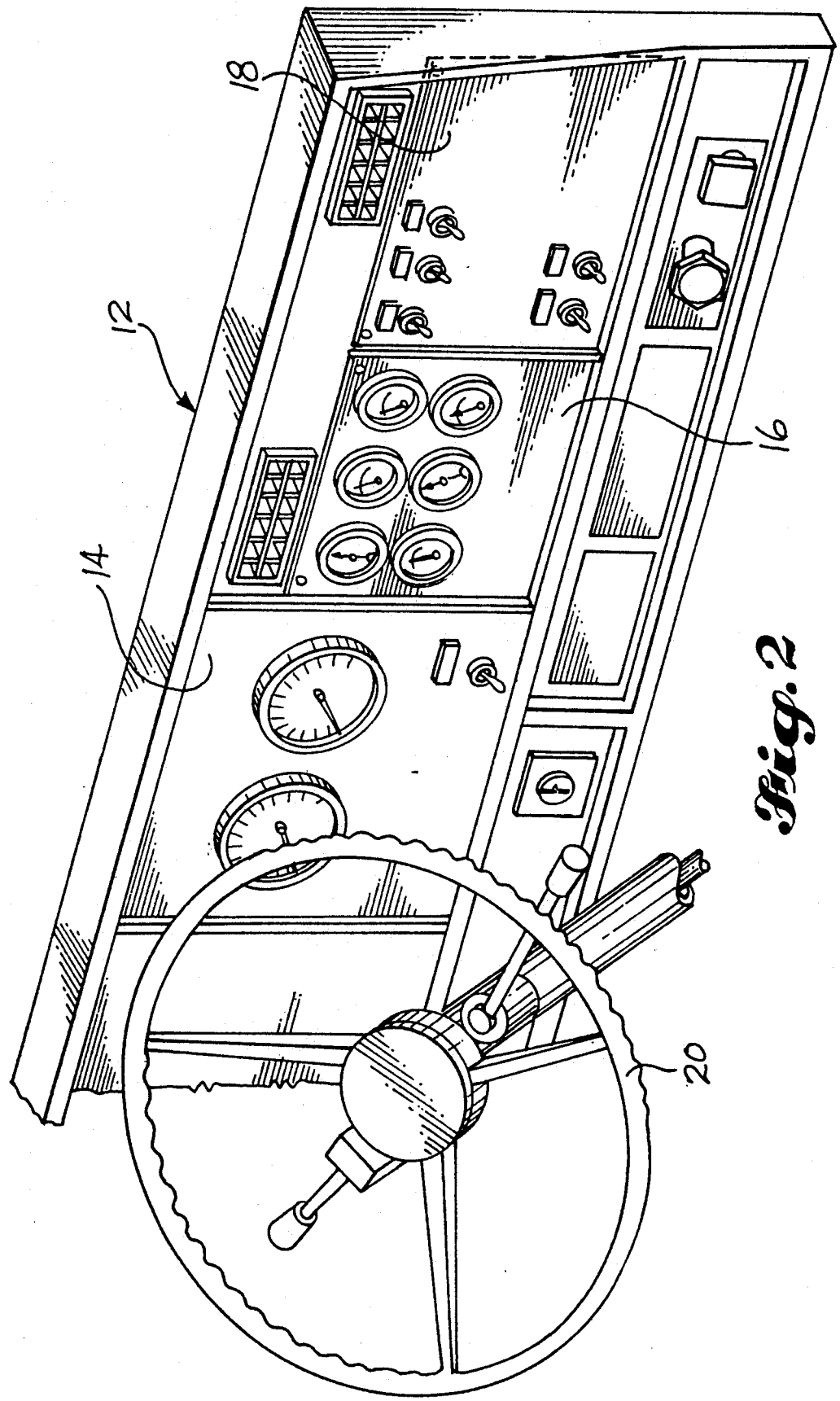
FIG. 2 is a pictorial view like FIG. 1, but shows the dashboard in a stock flat configuration prior to mounting thereon the add-on housing shown in FIG. 1.

Referring to FIG. 2, the dashboard 12 is shown there prior to its modification by the addition of the housing 10. The skilled person would be familiar with the general layout of such a dashboard 12, as all gauges and switches conform to Regulated Common Carrier (R.C.C.) dash layout, including the arrangement of its various instrumentation panels 14, 16, 18.

Figure 3:
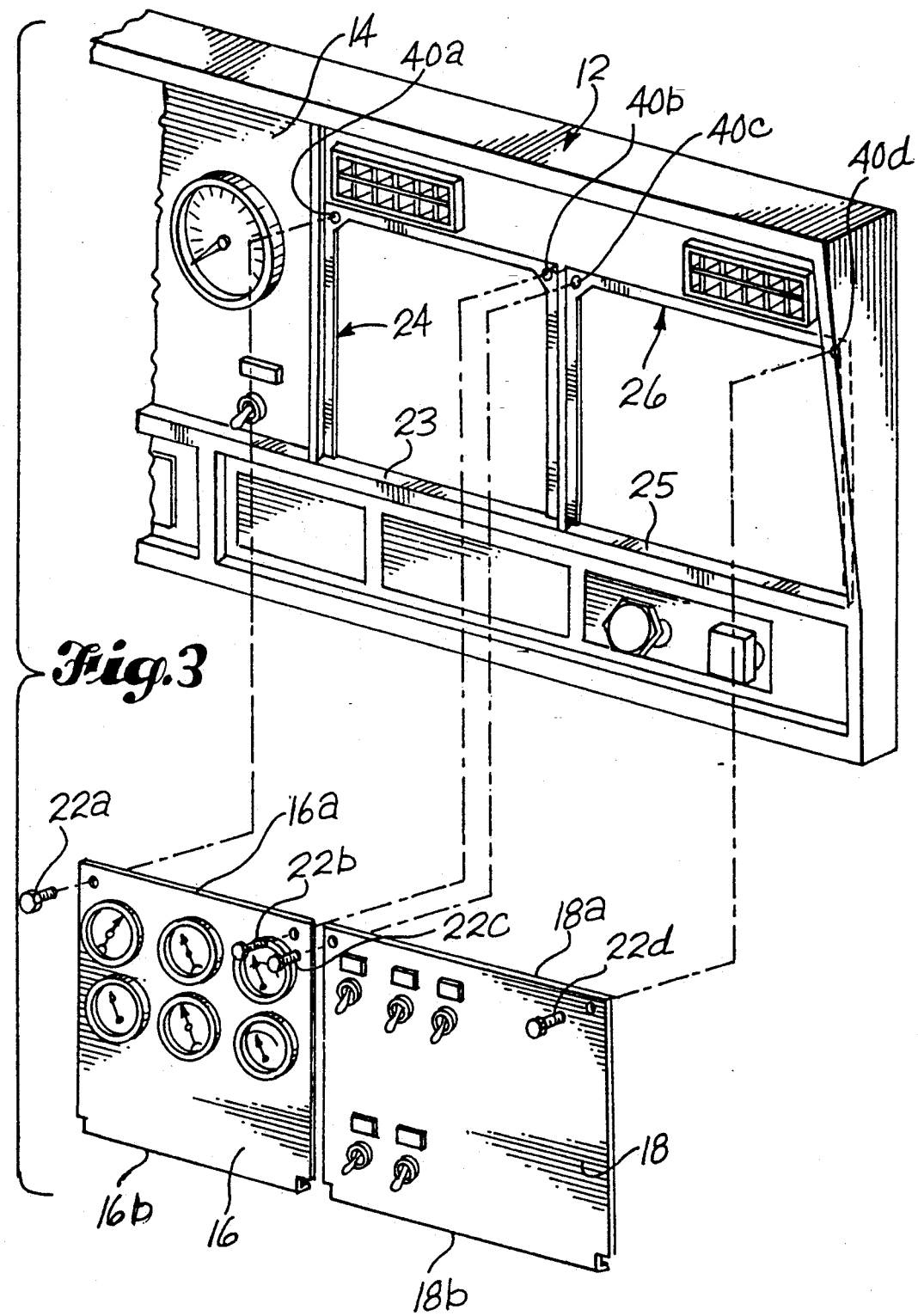
FIG. 3 is an exploded pictorial view similar to FIGS. 1 and 2, but shows a frontal region in the right-hand portion of the dashboard, and illustrates how instrument panels are detachably mounted to such region.
Figure 4:
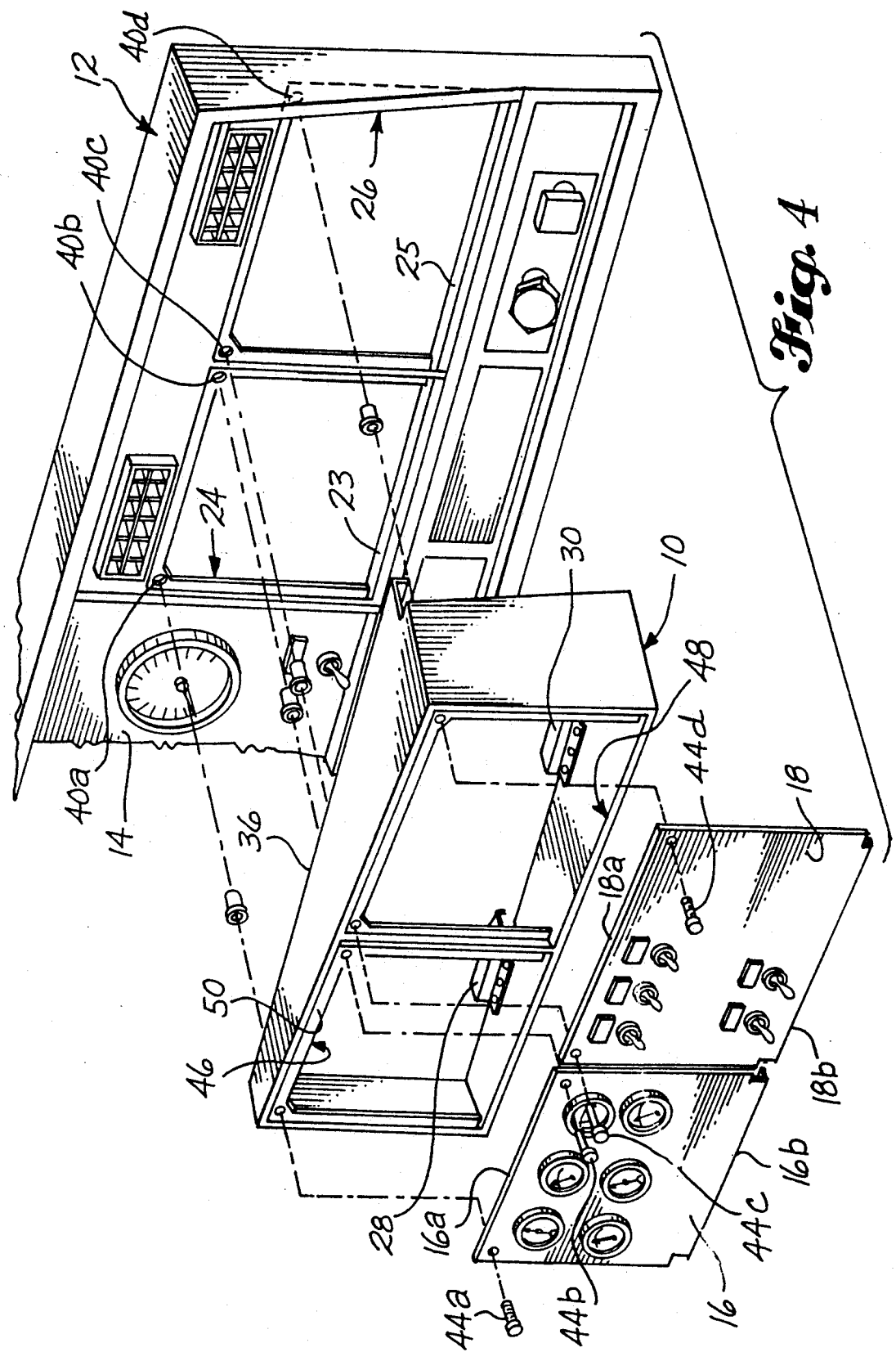
FIG. 4 is an exploded view similar to FIG. 3, but shows how the add-on housing shown in FIG. 1 is mounted to the frontal region of the dashboard after detachment of the instrument panels, and how the instrument panels are thereafter remounted to the forward face of the add-on housing.

As is apparent from FIGS. 3 and 4, the add-on housing 10 is intended to move two of the instrument panels 16, 18 closer to the driver, i.e. those two which are located on the dashboard to the right of steering wheel 20. This is accomplished by first detaching instrument panels 16, 18 from the dashboard 12, with their respective instruments connected thereto, i.e. gauges and switches. The instrument panels 16, 18 are detachably mounted to the dashboard by screws 22a–22d. These screws 22a–22d connect panel upper edges 16a, 18a to the dashboard after their lower edges 16b, 18b have been inserted behind retainers 23, 25 positioned at the bottom of each dashboard opening 24, 26.

After removal of instruments panels 16, 18 in the manner shown in FIG. 3, the add-on housing 10 is connected to the dashboard 12. As is apparent, it is sized and shaped so that it covers the same frontal region on the dashboard 12 that is normally taken up by instrument panels 16, 18 in the stock configuration. For the sake of understanding certain terminology as used here, "stock configuration" means as supplied by the manufacturer.

Figure 5:
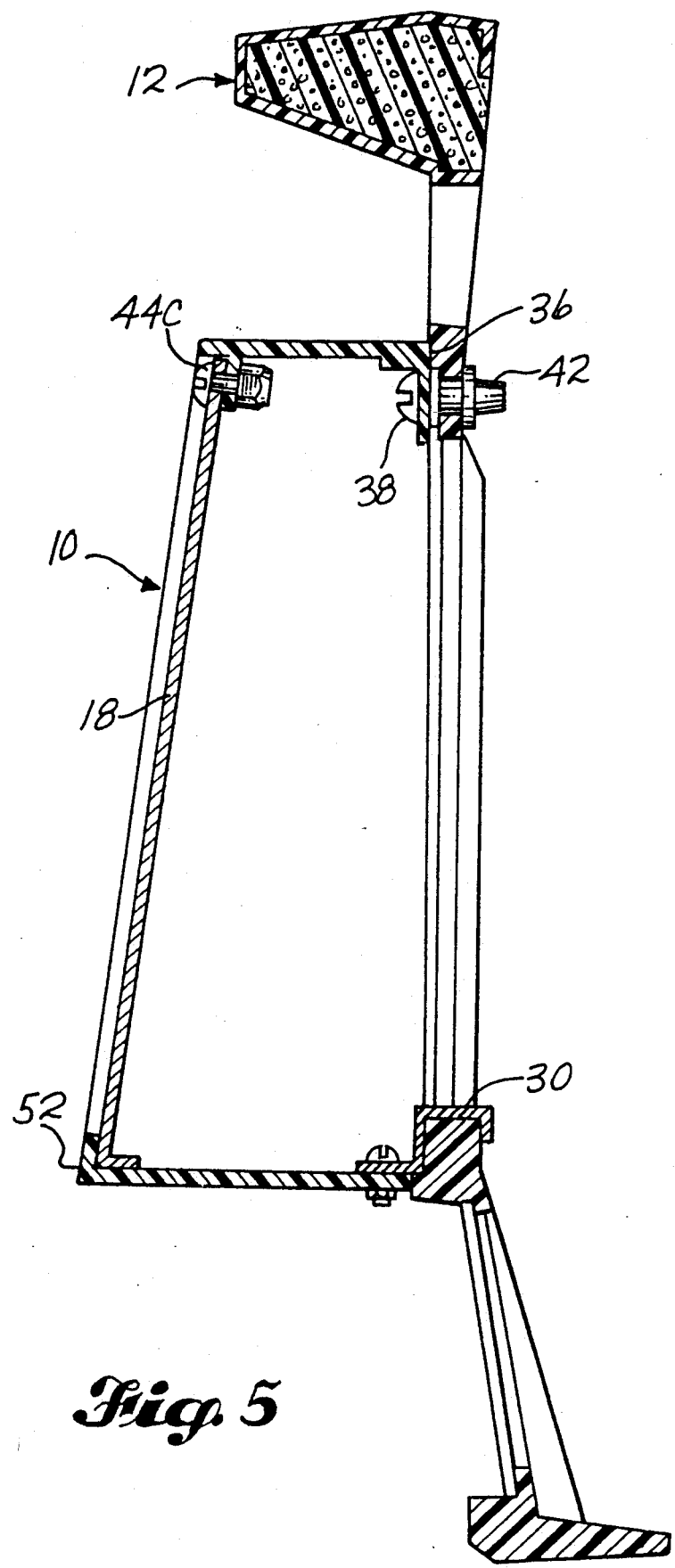
FIG. 5 is a side cross-sectional view of the add-on housing shown in FIGS. 1 and 4, taken along line 5—5 in FIG. 1, and shows how it is connected to the dashboard.
Figure 6:
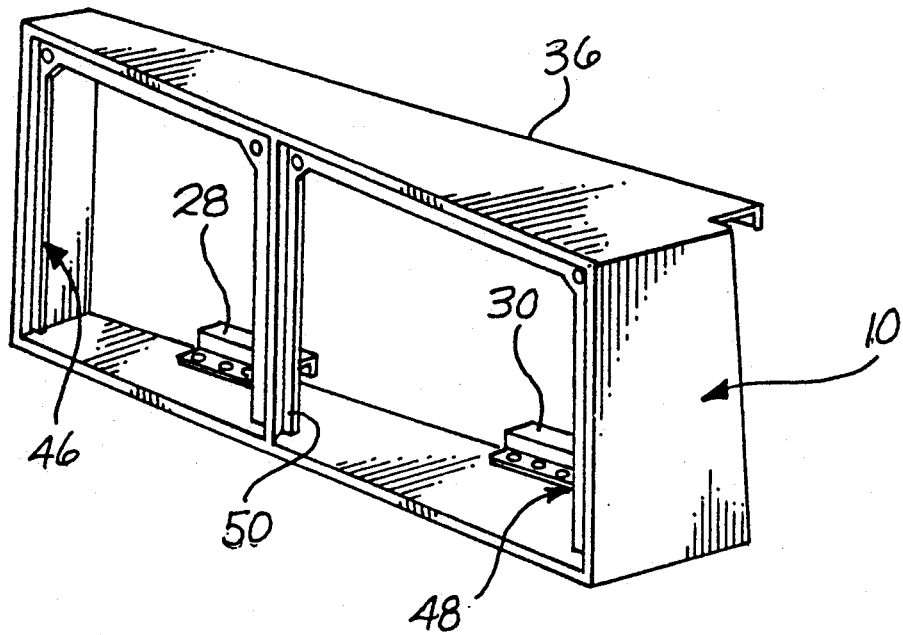
FIG. 6 is a pictorial view of the add-on housing shown in FIGS. 1, 4 and 5.

The add-on housing 10 is mounted to the dashboard by a pair of lower hooks 28, 30, which hook over the lower retainers 23, 25 of panel openings 24, 26. The upper edge 36 of the housing 10 is connected to the dashboard by conventional screws 38a–38d (see FIG. 5). These extend through the existing holes 40a–40d in the dashboard, and are threaded into conventional riv-nut fasteners. After the add-on housing 10 is mounted to the dashboard 12, the instrument panels 16, 18 are re-attached to the front face of the housing by screws 44a–44d. This mode of attachment is similar to the way the instrument panels 16, 18 were originally attached to the dashboard 12, prior to its modification.

Figure 7:
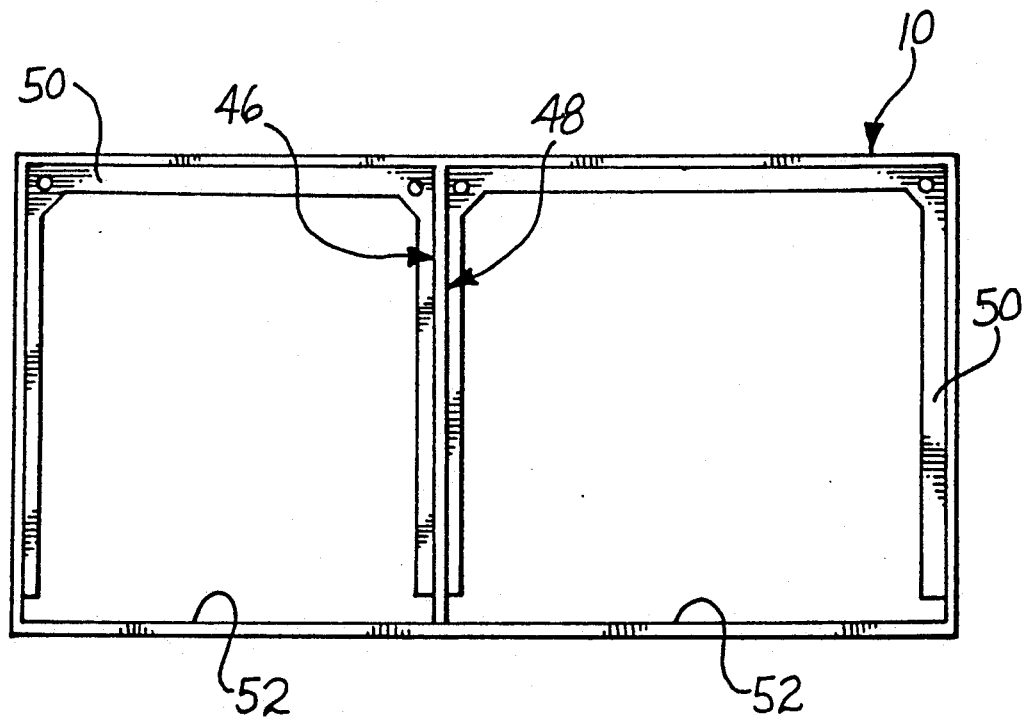
FIG. 7 is a frontal view of the add-on housing shown in FIG. 6.

Referring now to FIGS. 6–9, and to FIG. 7 in particular, the front face 46 of the housing has two panel openings, one indicated generally at 46, and the other indicated generally at 48. Both of these panel openings 46, 48 are spaced forwardly of the dashboard 12, as a result of the housing 10 projecting forwardly of the dashboard after it has been mounted thereto.

Preferably, each panel opening 46, 48 in the housing 10 is the same size as the original panel-mounting opening 24, 26 in the stock dashboard. That is, each is sized and shaped to receive its respective instrument panel 16, 18, and to forwardly space each panel from its original position in the dashboard 12.

Each panel opening 46, 48 has a lip 50 that extends around three quarters of its circumference. The instrument panels 16, 18 respectively rest upon such lip when they are re-attached. The lower edge 52 of each panel opening is raised slightly, so as to define a retainer that captures the lower edges 16b, 18b of the instrument panels.

Figure 8:
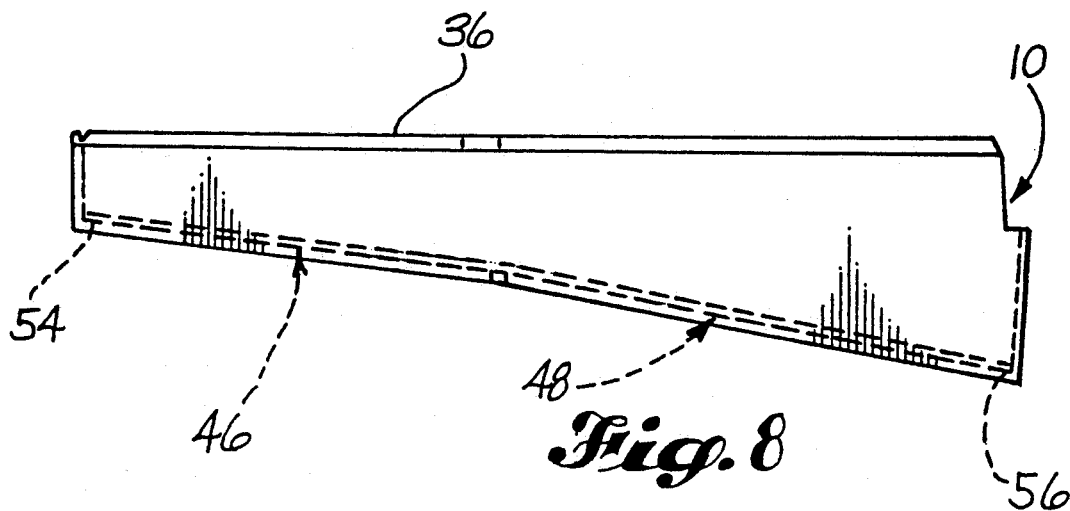
FIG. 8 is a top plan view of the add-on housing shown in FIGS. 6 and 7.
Figure 9:
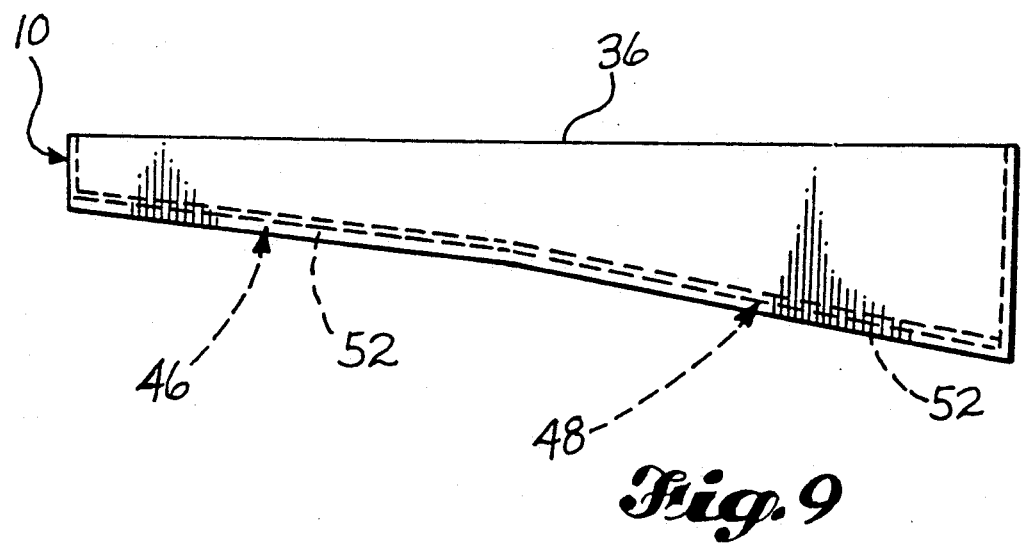
FIG. 9 is a bottom plan view of the add-on housing shown in FIGS. 6—8.

As is best seen in FIG. 8, the front face of the housing 10 is angled toward the driver as it extends from the inwardmost edge 54 of the first panel opening 46 to the outwardmost edge 56 of the second panel opening 48. This causes the add-on housing 10 to emulate wrap-around dashboards, bringing the instrument panels 16, 18 closer to the driver as they extend from the steering wheel 20 toward the right-hand side of the cab. As is further apparent from FIGS. 8 and 9, the first panel opening 46 is angled very slightly with respect to the second panel opening 48. This enhances the wrap-around effect.

The add-on housing 10 is designed to be used in connection with Kenworth (trademark) trucks, and to modify the stock dashboard configuration of older Kenworth trucks. As such, it is anticipated that it will be used in identical form to what is shown in the drawings. However, the same concept may be employed in connection with other kinds of dashboards, and it is conceivable that a similar kind of add-on housing could be used to reposition a single instrument panel closer to the driver, instead of the two instrument panels described above. Naturally, this would depend on the stock configuration of the dashboard as it is produced by the truck manufacturer.

Consequently, the preceding description should not be taken in the limiting sense. What is intended to be the invention patented here is to be defined instead by the subjoined patent claim or claims, the interpretation of which is to be made in accordance with the well-established doctrines of patent claim interpretation.

What is claimed is:

1. For use in connection with a pre-existing dashboard in a semi-tractor cab, said dashboard being of a stock configuration having a steering column projecting from said dashboard into said cab, said dashboard having at least one pre-existing instrument panel normally mounted to a portion of a frontal region of said dashboard adjacent one side of said steering column, and wherein said instrument panel carries a plurality of dashboard instruments, and further, said instrument panel and said instruments being detachable and movable as a unit away from said frontal region into said cab without making any electrical disconnections of said instruments, an add-on dashboard accessory for remounting and repositioning said instrument panel closer to the location where a driver of said semi-tractor normally sits, for providing said driver with better access to said instruments, said dashboard accessory comprising:

- a hollow housing that is mountable to said frontal region of said dashboard, said housing being sized and shaped in a manner such that, when said housing is mounted to said frontal region, said housing covers substantially only the portion of said frontal region where said instrument panel was normally mounted thereto, and when so mounted, said housing projecting from said dashboard, and further, said housing having at least one panel opening in a frontal face area of said housing, said panel opening being sized and shaped for remounting said instrument panel therein, to thereby simultaneously reposition said instrument panel and said instruments carried thereby closer to said vehicle driver, and in use, said instrument panel and said instruments are first detached as a unit from said frontal region of said dashboard, thereby defining an opening in said dashboard, said dashboard opening being at least partially surrounded by a peripheral border lip region of said dashboard, and said housing is thereafter mounted to said frontal region, followed by mounting said instrument panel and said instruments as a unit to said panel opening in said frontal face area of said housing, to thereby reposition said instrument panel closer to said vehicle driver, and further, said housing being mounted to said frontal region by at least being connected to certain spaced-apart areas of said border lip region.

2. The invention set forth in claim 1, wherein said dashboard opening is rectangular, and wherein said housing is connected to at least two spaced-apart areas of said peripheral border lip region, each one of said two areas being positioned adjacent one side of generally opposite sides of said dashboard opening.

3. A method for repositioning at least one existing vehicle instrument panel inside the cab of a vehicle, said instrument panel holding a plurality of dashboard instruments, said instrument panel being detachably mounted to a portion of a frontal region of a dashboard via a plurality of screw fasteners that extend through apertures in said panel and being engaged with matching fastener openings in said dashboard, said vehicle having a steering column and said frontal region being adjacent one side of said steering column, said method enabling the repositioning of said instrument panel and instruments as a single unit to a position spaced from the dashboard, so that said instrument panel is positioned closer to the location where the vehicle driver normally sits, for providing said driver with better access to said instruments, said method comprising:

- detaching said instrument panel and said instruments as a unit from said frontal region of said dashboard by removing said fasteners from engagement with said fastener openings, and thereby creating a dashboard opening in said dashboard;
- mounting a hollow, add-on dashboard accessory housing to said frontal region of said dashboard, said housing being sized and shaped such that said housing covers substantially only the portion of said frontal region where said instrument panel was mounted, said housing projecting from said dashboard in a direction generally into said vehicle cab; followed by
- pulling said instrument panel forwardly through said hollow housing, without electrically disconnecting said instruments, and
- remounting said panel in a panel opening across a frontal face region of said housing, to thereby reposition said panel and instruments as a unit closer to said vehicle driver.

4. The method of claim 3, wherein said instrument panel and said dashboard opening are both rectangular, and wherein said housing is connected to said dashboard only along spaced-apart areas adjacent said dashboard opening.

5. The method of claim 3, wherein mounting said accessory housing to said frontal region of said dashboard includes using said fastener openings in said dashboard to connect said housing to said dashboard.

* * * * *